Figure 1:
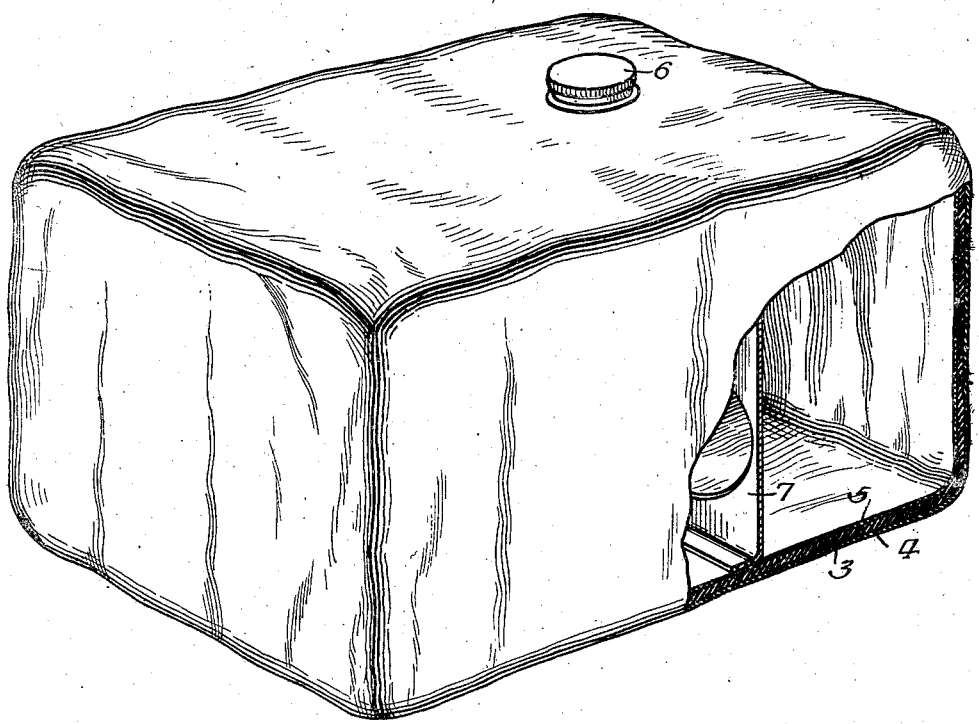

Sept. 3, 1946.　　　　　S. RETHORST　　　　2,406,903

FUEL CONTAINER AND METHOD OF MAKING SAME

Filed July 29, 1940

Inventor
Scott Rethorst
By Thed Gerlach
his Atty

Patented Sept. 3, 1946

2,406,903

UNITED STATES PATENT OFFICE 2,406,903

FUEL CONTAINER AND METHOD OF MAKING SAME

Scott Rethorst, Los Angeles, Calif., assignor, by mesne assignments, to Consolidated Vultee Aircraft Corporation, a corporation of Delaware Application July 29, 1940, Serial No. 348,098

14 Claims. (Cl. 154—139)

The present invention relates generally to containers for fuel. More particularly the invention relates to that type of container which is primarily designed or adapted for use as the fuel retaining or holding medium of an airplane and is of the so-called "self healing" variety by reason of the fact that it automatically seals itself when punctured by a projectile.

One object of the invention is to provide a container of this type which is an improvement upon, and is more efficient than, previously designed containers of like character.

Another object of the invention is to provide a self healing fuel container which is in the form of a flexible bag and consists of an intermediate layer of plastic uncured rubber, an outer reinforcing layer of cured or vulcanized rubber and an inner layer of synthetic rubber or other material which is insoluble in, and is unaffected by, gasoline or other hydrocarbons.

A further object of the invention is to provide a self healing fuel container of the last mentioned character in which the outer and inner layers are bonded together throughout their contacting areas or surfaces by being vulcanized in situ on the outer and inner surfaces of said intermediate layer, respectively.

A still further object of the invention is the provision of a simple and novel method of making a self healing container forming material of the type under consideration.

Other objects of the invention and the various advantages and characteristics of the present fuel container material and its method of manufacture will be apparent from a consideration of the following detailed description.

The invention consists in the several novel features which are hereinafter set forth and are more particularly defined by claims at the conclusion hereof.

Figure 2:

In the drawing which accompanies and forms a part of this specification or disclosure and in which like numerals of reference denote corresponding parts throughout the several views:

Figure 1 is a fragmentary perspective view of a fuel container embodying the invention; and Figure 2 is an enlarged section through one of the walls of the container.

The container which is shown in the drawing constitutes the preferred embodiment of the invention. It is primarily designed to hold gasoline or other hydrocarbon type fuel and has particular utility as the fuel retaining medium of an airplane. As shown in the drawing, the container is in the form of a flexible bag and consists of an intermediate layer 3, an outer layer 4 and an inner layer 5. The intermediate layer 3 is preferably about ⅛ of an inch in thickness and is formed of plastic raw or uncured rubber. In practice it has been found that the best results are obtained when the plasticity of the uncured rubber constituting the intermediate layer 3 is approximately 80 as measured by a Williams parallel plate plastometer. The intermediate layer 3 may be, and is preferably, formed by milling for about thirty minutes crude rubber or pale crepe rubber. Such milling or mastication of the rubber so breaks down the miscellae that the rubber has marked ability to assume plastic deformation, i. e., the rubber is capable of flowing. In addition the rubber has comparatively great or high cohesiveness while at the same time it has substantially no elastic tendencies and is non-adhesive or non-tacky. Because of the fact that the intermediate layer 3 is formed of plastic and highly cohesive raw or uncured rubber the container is of the self healing variety. It is contemplated, so far as the present invention is concerned, that the rubber constituting the intermediate layer be rendered plastic not only by milling but also by heating, chemical mastication, or any other known method. In measuring the plasticity of raw or uncured rubber regardless of whether the plastic nature of the rubber is brought about by heating or by mechanical or chemical mastication, a spherical ball of rubber having a weight of 0.4 gram is placed between two parallel plates under a load of 5 kilograms at 100° centigrade for 30 minutes. The thickness of the ball is then measured in hundredths of millimeters with the load remaining. The numerical measure of the thickness of the ball expresses or constitutes the plasticity of the rubber. When the rubber constituting the intermediate layer is rendered plastic to the desired degree by milling or otherwise it is essentially cohesive and capable of marked flow characteristics as hereinbefore pointed out. It is essentially non-adhesive and tends to swell when contacted by gasoline. Because of this tendency and the foregoing characteristics of the rubber of which the intermediate layer is formed there is a self-healing action when the container is punctured by a projectile. When the container is punctured a small amount of gasoline in the container flows into the punctured portion of the intermediate layer and this results in such swelling of the portion of the uncured rubber at the point of puncture that the puncture is immediately sealed or closed. Sealing or closing of the cut portion of the intermediate layer is due or attributable not only to the swelling that is caused by gasoline entering the cut or puncture but also to the fact that the uncured rubber at the cut or puncture flows together and unites as a result of its cohesive tendency.

The outer layer 4 serves as a reinforcing or strengthening medium for the intermediate layer 3 and is coextensive with the latter. It is in contacting relation with the intermediate layer and is bonded to the latter. Preferably the outer layer 4 is $\frac{3}{32}$ of an inch in thickness and is formed of cured or vulcanized rubber. In practice it has been found that the best results are obtained when the outer layer is formed of vulcanized rubber having a hardness of approximately 65 as measured by a Shore durometer and in addition tensile strength of approximately 3500 pounds per square inch and an elongation of 550 per cent at break. Vulcanized rubber of this character is relatively hard and has such elasticity that when expanded by the passage of a projectile therethrough it returns to its original position and thereby closes the hole or puncture. When a projectile punctures cured rubber of the type hereinbefore specified it leaves a small slit and consequently there is no likelihood of the uncured rubber constituting the intermediate layer 3 flowing through the outer layer. The intermediate layer 3 has no sulphur or other curing ingredients in it and hence it remains plastic at all times and fulfills its intended purpose as a self healing medium. The intermediate layer 3 is bonded to the outer layer 4 as the result of a slight migration of the vulcanizing agent in the outer layer into the outer face of the intermediate layer during the hereinafter described vulcanizing operation. This factor together with the cohesive nature of the intermediate layer 3 causes the intermediate layer to follow the outer layer in returning it to its original position directly after the container is punctured by a projectile.

The inner layer 5 is coextensive with, and is bonded to, the intermediate layer and is formed of synthetic rubber, such, for example, as "neoprene" or "Thiokol." Such material when vulcanized is insoluble in, and is unaffected by, gasoline or other hydrocarbons. The inner layer is preferably $\frac{3}{32}$ of an inch in thickness and prevents the gasoline in the container from normally contacting and affecting the intermediate layer of plastic uncured rubber. When the container is punctured the puncture in the inner layer allows a small portion of the gasoline in the container to flow into the puncture in the intermediate layer, as heretofore pointed out, and this results in swelling of the intermediate layer at the point of puncture and filling of the puncture in the inner layer with uncured rubber from the intermediate layer. The synthetic rubber constituting the inner layer 5 preferably has a hardness of 35 as measured by a Shore durometer. It is flexible, as well as elastic, and is chemically resistant to or insoluble in gasoline and other hydrocarbons. In addition to preventing normal contact of the gasoline in the container with the intermediate layer of milled uncured rubber the inner layer assists the outer layer in drawing together the punctured portion of the intermediate layer in connection with puncture of the container by a projectile.

In forming the container a mass of rubber having sulphur or other vulcanizing agents therein together with a suitable accelerator for the vulcanizing agent and a small quantity of zinc oxide for activating the accelerator is sheeted out by calendering or in any other suitable manner in order to form the outer layer 4. After this step a mass of plastic uncured rubber with no vulcanizing agent therein is calendered or otherwise sheeted onto the outer layer 4 in order to form the intermediate layer 3. Thereafter a mass of synthetic rubber, such as "neoprene" or "Thiokol" is calendered or otherwise applied onto the intermediate layer 3 in order to form the inner layer 5. After the various calendering operations the laminated or lamellated material consisting of the intermediate, outer and inner layers is placed in a suitable mold and is subjected for a period of approximately forty minutes to a temperature of approximately 287° F. in order to vulcanize the outer and inner layers. During vulcanization there is a small migration of the sulphur or other vulcanizing agent in the outer layer 4 into the outer surface of the intermediate layer 3 with the result that the two layers become permanently bonded together throughout their contacting area. The synthetic rubber of which the inner layer 5 is formed includes a small amount of sulphur or other vulcanizing agent and as a result there is a small amount of migration of the vulcanizing agent from the inner layer into the inner face of the intermediate layer and the two layers become permanently bonded together. If desired a small quantity of alum or other vulcanization retarder may be mixed with the uncured rubber constituting the intermediate layer 3 in order to restrict or limit the migration of the vulcanizing agents into the outer and inner layers into the intermediate layer. At the conclusion of the vulcanizing step or operation the resulting material consisting of the three bonded layers is used to form the baglike container. As shown in the drawing the container consists of top, bottom and side walls and has in the top wall thereof a filling opening which is normally closed by a cap 6. Collapse of the container is prevented by a crossweb 7 in the interior of the container.

The hereindescribed fuel container efficiently and effectively fulfills its intended purpose and is leak-proof due to the self healing character of the plastic uncured rubber intermediate layer 3. When the container is punctured by a projectile the punctured portion of the outer layer returns immediately to its original position and thereby closes the hole or crevice therein. In connection with return of the punctured portion of the outer layer to its original position the punctured portion of the plastic intermediate layer 3 is drawn together and a closing thereof takes place due to the cohesive and flow tendencies of the plastic uncured rubber and the swelling action that is attributable to the flow of gasoline into contact with the plastic uncured rubber. The intermediate layer, due to its cohesiveness, gathers itself together across the hole or crevice which the projectile forms therein, first at the edges and thereafter grows inwards toward the center of the slit until the hole or crevice is completely sealed. The cohesive and chemical sealing action of the rubber constituting the intermediate layer is in no way impeded by elastic forces in the intermediate layer tending to hold the hole or crevice open, or in a slightly parted position. The closing action of the intermediate layer when the latter is punctured may be likened to the healing of a flesh wound. The container is comparatively light in weight and may be used as a holding medium for lubricating oil as well as gasoline. Tests and experiments disclose that when the container is filled with gasoline and is penetrated by either tracer or incendiary projectiles no explosion or ignition of the gasoline occurs. Because of the simplicity of the method of manufacturing the material for the container the cost of the finished product is comparatively low.

Whereas the container has been described as being primarily adapted for use in an airplane it is to be understood that it may be used in other vehicles or in other capacities. It is also to be understood that the container may be made up of more than three layers, for example, the container may include in addition to the intermediate, inner and outer layers a layer of plastic raw or uncured rubber on the outer face of the outer layer 4 and a second vulcanized rubber layer outwardly of the second plastic rubber layer.

The invention is not to be understood as restricted to the details set forth since these may be modified within the scope of the appended claims without departing from the spirit and scope of the invention.

Having thus described the invention what I claim as new and desire to secure by Letters Patent is:

1. Container-forming material comprising a self healing intermediate layer of masticated rubber having pronounced cohesiveness but substantially no adhesive tendency or tackiness, an outer layer of tough elastic material bonded to the outer face of, and serving to reenforce, the self healing intermediate layer and adapted in connection with puncture of the container wall to have its punctured portion spring together or contract and draw together the punctured portion of the self healing layer, and an inner layer bonded to the inner face of said self healing layer and formed of flexible elastic material that is normally fluid impervious or non-porous and also insoluble in, and unaffected by, hydrocarbons.

2. Container-forming material comprising a self healing intermediate layer of milled uncured rubber possessing comparatively high cohesiveness but substantially no tackiness or vulcanizing material, and having a plasticity of approximately 80 as measured by a Williams parallel plate plastometer, a coextensive outer layer of tough elastic material bonded to the outer face of, and serving to reenforce, the self healing intermediate layer, and adapted in connection with puncture of the container to have its punctured portions spring together or contract and draw together the punctured portion of said self healing layer, and a coextensive normally fluid impervious or non-porous inner layer formed of flexible elastic material that is insoluble in, and unaffected by, hydrocarbon.

3. Container-forming material comprising a self healing intermediate layer of masticated raw rubber having pronounced cohesiveness but substantially no adhesive tendency or vulcanizing material, an outer layer of tough highly elastic vulcanized rubber vulcanized in situ on the outer face of, and serving to reenforce, the self healing layer and adapted in connection with puncture of the container wall to have its punctured portion spring together or contract and draw together the punctured portion of the self healing layer, and an inner layer bonded to the inner face of said self healing layer and formed of flexible elastic material that is normally fluid impervious or non-porous and also insoluble in, and unaffected by, hydrocarbons.

4. Container-forming material comprising a self healing intermediate layer of masticated rubber having pronounced cohesiveness but substantially no adhesive tendency or tackiness, an outer layer of tough elastic material bonded to the outer face of, and serving to reenforce, the self healing intermediate layer and adapted in connection with puncture of the container wall to have its punctured portion spring together or contract and draw together the punctured portion of the self healing layer, and an inner layer formed of elastic vulcanized synthetic rubber of the type that is insoluble in, and unaffected by, hydrocarbons and vulcanized in situ on the inner face of said self healing layer.

5. Container-forming material comprising a self healing intermediate layer of masticated rubber having pronounced cohesiveness but substantially no adhesive tendency or tackiness, an outer layer of tough highly elastic vulcanized rubber vulcanized in situ on the outer face of, and serving to reenforce, the self healing layer and adapted in connection with puncture of the container wall to have its punctured portion spring together or contract and draw together the punctured portion of the self healing layer, and an inner layer formed of elastic vulcanized synthetic rubber of the type that is insoluble in, and unaffected by, hydrocarbons and vulcanized in situ on the inner face of said self healing layer.

6. A hydrocarbon container embodying a wall in the form of a self healing intermediate layer of milled uncured rubber possessing comparatively high cohesiveness but substantially no tackiness or vulcanizing material, and having a plasticity of approximately 80 as measured by a Williams parallel plate plastometer, an outer layer of tough highly elastic vulcanized rubber vulcanized in situ on the outer face of, and serving to reenforce, the self healing layer and adapted in connection with puncture of the container wall to have its punctured portion spring together or contract and draw together the punctured portion of the self healing layer, and an inner layer formed of vulcanized synthetic rubber of the type that is insoluble in, and unaffected by, hydrocarbons and vulcanized in situ on the inner face of said self healing layer.

7. A hydrocarbon container embodying a wall in the form of a self healing intermediate layer of masticated rubber having pronounced cohesiveness but substantially no adhesive tendency or tackiness, a coextensive outer layer formed of tough elastic vulcanized rubber having a hardness of approximately 65 as measured by a Shore durometer and tensile strength of approximately 3500 pounds per square inch, vulcanized in situ on the outer face of the self healing intermediate layer, and adapted in connection with puncture of the container wall to have its punctured portion spring together or contract and draw together the punctured portion of the self healing layer, and a coextensive inner layer bonded to the inner face of said self healing layer and formed of flexible material that is normally fluid impervious or non-porous and is also insoluble in, and unaffected by, hydrocarbons.

8. That improvement in the manufacture of self healing container forming material which comprises arranging in lamellated relation an outer layer of rubber with a vulcanizing agent therefor, an intermediate layer of masticated rubber having extremely high cohesiveness, but no vulcanizing material therein, and an inner layer of synthetic rubber with a vulcanizing agent therein, and then subjecting the layers to a vulcanizing temperature for sufficient time to effect vulcanization of the outer and inner layers and also to bond the latter permanently to the intermediate layer without affecting to any appreciable extent the physical properties and characteristics of said intermediate layer.

9. The method of fabricating self healing container forming material which comprises as steps first arranging in superposed relation an outer layer of uncured rubber with a vulcanizing agent therein, an intermediate layer of milled raw or uncured rubber possessing extremely high cohesiveness but substantially no adhesive tendency or vulcanizing material and having a plasticity of approximately 80 as measured by a Williams parallel plate plastometer, and a thin inner layer of uncured synthetic rubber with a vulcanizing agent therein, and then subjecting the layers to heat for a sufficient period to vulcanize the outer and inner layers and also bond them permanently to the intermediate layer without affecting to any appreciable extent the physical properties and characteristics of the last mentioned layer.

10. Container forming material comprising a self healing intermediate layer formed for the most part of milled rubber having an extremely high degree of cohesiveness but substantially no adhesiveness or tackiness, an outer layer of tough elastic vulcanized rubber vulcanized into permanently bonded relation with the outer face of, and serving to reenforce, the intermediate layer and adapted in connection with puncture of the material to have its punctured portion spring together or contract and draw together the punctured portion of said intermediate layer, and an inner layer arranged in adhering relation with the inner face of the intermediate layer, formed of elastic flexible rubber type material that is insoluble in, and unaffected by, hydrocarbons, and serving to assist the outer layer in drawing together the punctured portion of the intermediate layer in connection with puncture of the material.

11. Container forming material comprising a self healing intermediate layer formed for the most part of milled rubber possessing an extremely high degree of cohesiveness but substantially no adhesiveness or tackiness, an outer layer of tough elastic vulcanized rubber vulcanized into permanently bonded relation with the outer face of, and serving to reenforce, the intermediate layer and adapted in connection with puncture of the material to have its punctured portion spring together or contract and draw together the punctured portion of said intermediate layer, and an inner layer formed of vulcanized synthetic rubber of the type that is insoluble in, and unaffected by, hydrocarbons, vulcanized into permanently bonded or adhering relation with the inner face of said intermediate layer, and serving to assist the outer layer in drawing together the punctured portion of said intermediate layer in connection with puncture of the material.

12. Container forming material comprising a self healing intermediate layer formed of milled uncured rubber possessing an extremely high degree of cohesiveness but substantially no vulcanizing material therein and substantially no adhesiveness or tackiness and having a plasticity of approximately 80 as measured by a Williams parallel plate plastometer, an outer layer of tough vulcanized rubber vulcanized into permanently bonded relation with the outer face of, and serving to reenforce, the intermediate layer, having hardness of approximately 65 as measured by a Shore durometer and tensile strength of approximately 3500 pounds per square inch, and adapted in connection with puncture of the material to have its punctured portion spring together or contract and draw together the punctured portion of said intermediate layer, and a non-porous inner layer bonded to the inner face of said intermediate layer and formed of elastic flexible material that is insoluble in, and unaffected by hydrocarbons.

13. Container forming material comprising a self healing intermediate layer formed of milled uncured rubber possessing a high degree of cohesiveness but substantially no vulcanizing material therein and substantially no adhesiveness or tackiness and having a plasticity of approximately 80 as measured by a Williams parallel plate plastometer, a coextensive outer layer formed of tough unvulcanized rubber having hardness of approximately 65 as measured by a Shore durometer and tensile strength of approximately 3500 pounds per square inch, vulcanized into permanently bonded relation with the outer face of, and serving to reenforce, the intermediate layer, and adapted in connection with puncture of the material to have its punctured portion spring together or contract and draw together the punctured portion of said intermediate layer, and a coextensive inner layer formed of elastic vulcanized synthetic rubber of the type that is insoluble in, and unaffected by, hydrocarbons and vulcanized into permanently bonded relation with the inner face of said intermediate layer.

14. A leakproof container-forming substance comprising a self healing intermediate layer of milled rubbery material possessing a comparatively high degree of cohesiveness but substantially no adhesiveness or tackiness, an outer layer of tough elastic vulcanized rubber vulcanized in situ on the outer face of, and serving to reenforce, the intermediate layer and adapted in connection with puncture of the substance to have its punctured portion spring together or contract and draw together the punctured portion of said intermediate layer, and an inner layer formed of elastic vulcanized synthetic rubber of the type that is insoluble in, and unaffected by, hydrocarbons, vulcanized in situ on the inner face of said intermediate layer, and serving to assist the outer layer in drawing together the punctured portion of said intermediate layer in connection with puncture of the substance.

SCOTT RETHORST.